Patented Oct. 17, 1922.

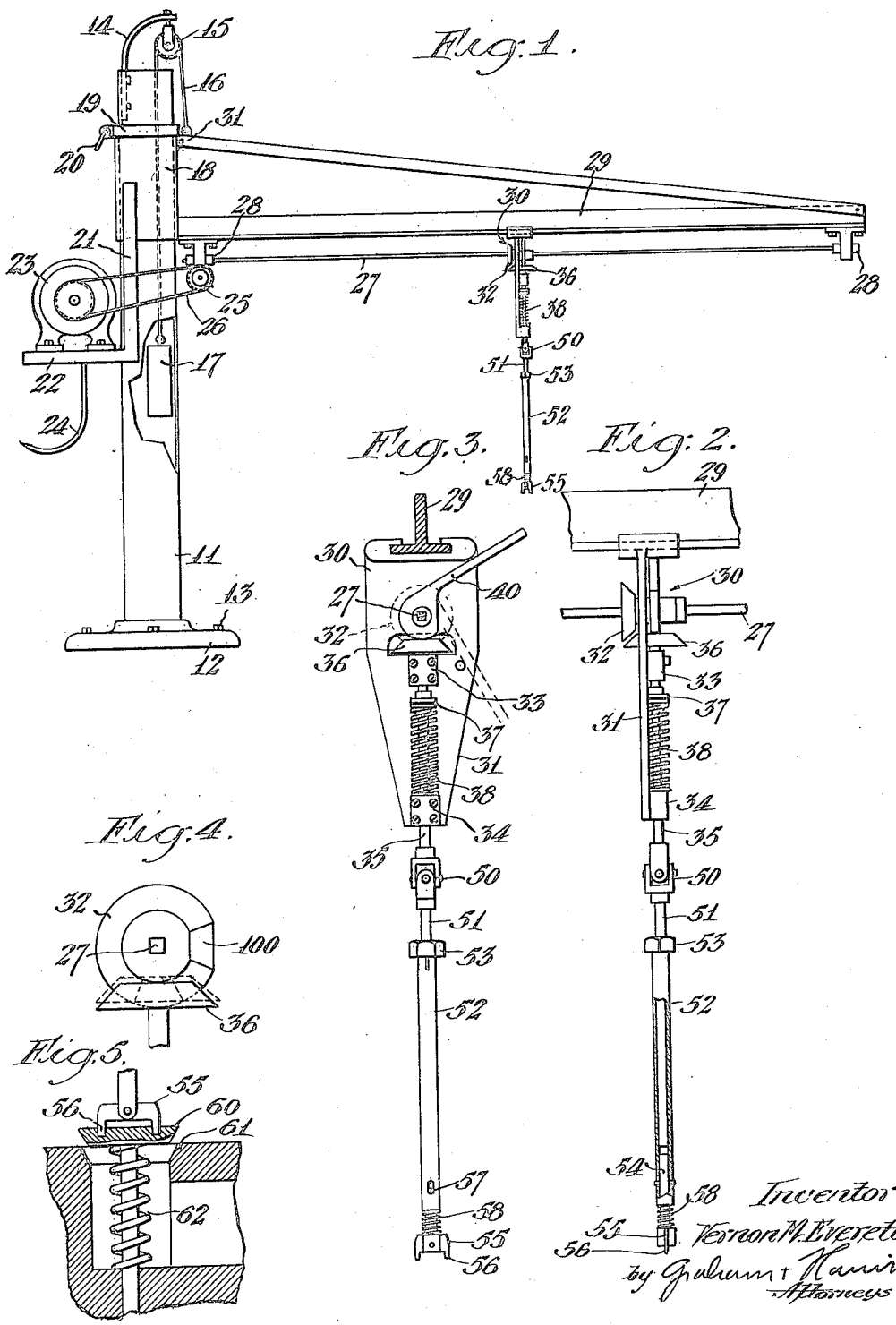

1,432,168

UNITED STATES PATENT OFFICE.

VERNON M. EVERETT, OF FULLERTON, CALIFORNIA.

VALVE GRINDER.

Application filed October 26, 1920. Serial No. 419,566.

*To all whom it may concern:*

Be it known that I, VERNON M. EVERETT, a citizen of the United States, residing at Fullerton, county of Orange, State of California, have invented a new and useful Valve Grinder, of which the following is a specification.

My invention relates to manufacture and repair of internal combustion engines.

The principal object of the invention is to provide a device by which the valves in the standard form of internal combustion engine may be readily ground to make a gas tight joint with their seats.

A further object of the invention is to provide a valve grinder by which the valve may be very rapidly and efficiently ground.

My invention is applicable to garage use for the purpose of regrinding valves or for use in a factory where automobiles are manufactured.

Further objects and advantages will be made evident hereinafter.

Referring to the drawings which are for illustrative purposes only,

Fig. 1 is a side elevation of my invention.

Fig. 2 is an enlarged view, partly in section, of a portion of the same.

Fig. 3 is a view of the portion shown in Fig. 2 as seen at right angles to that figure.

Fig. 4 is an enlarged view of the bevel frictions.

Fig. 5 is a diagrammatic view showing the method of grinding the valve.

In the embodiment of my invention shown in these drawings, I provide a column 11 having a footing 12 which may be secured to the floor by any convenient means, such for example, as the bolts 13. The column 11 may be conveniently made of pipe and carries a bracket 14 at its upper end. The bracket 14 carries a sheave 15 over which a rope 16 passes, the rope 16 being secured at one end to a counter-weight 17 carried inside the column 11, and to a carriage 18 at the other. The carriage 18 slides up and down on the pipe column 11 and is provided with a clamping bar 19 which is tightened by a screw 20 to secure the carriage 18 at any desired position on the column 11. Members 21 carried on the carriage 18 support a platform 22 on which a motor 23 is placed, this motor being fed with current through a flexible cord 24 or by any other convenient means. The motor 23 drives a driving gear 25 through a belt 26, this driving gear driving a square shaft 27. The shaft 27 turns in bearings 28 secured at either end of a radius bar 29 which is secured at one end on the carriage 18 and which is supported at the other end by a strut whose other end is secured to the carriage 18. The radius bar 29 may conveniently be of T section. Sliding on the radius bar 29 are one or more heads 30, each of these heads comprises a plate 31 through which the shaft 27 passes. Secured on the shaft 27 close to the plate 31 is a driving bevel friction cone 32. Turning and sliding in bearings 33 and 34 on the plate 31 is a shaft 35, this shaft carrying a driven beveled friction cone 36 at its upper end. A collar 37 secured on a shaft 35 is forced upwardly by a compression spring 38, the purpose of the spring 38 being to force the friction cone 36 against the friction cone 32. A cam 40 secured in the plate 31 is provided, this cam being so shaped that it forces the shaft 35 downwardly to disengage the friction cones in the position shown in full lines in Fig. 3. The spring 38 forcing the shaft 35 upwardly allows the friction cones to engage when the cam 40 is turned in the position shown in dotted lines in Fig. 3. Secured to the lower end of the shaft 35 by universal joint 50 is a second shaft 51 to which a sleeve 52 may be frictionally locked by a nut 53. Secured on the lower end of the sleeve 52 is a pin 54 which carries a plate 55 having two prongs 56. The pin 54 is free to slide inside the sleeve 52 being secured by a pin 57 and a compression spring 58 is provided for the purpose of providing resiliency at this point.

The device is used to grind a valve shown at 60, this valve cooperating with a seat 61 but being held away from this seat by a spring 62 which is slipped there around for this purpose, whenever the valve is to be ground.

The method of operation of the invention is as follows:

The engine which is to have its valve ground is moved into the neighborhood of the column 11 and the radius bar 29 with the carriage 18 and its attached parts is swung over the automobile which is to have its valves ground. The head 30 sliding freely on the radius bar assists in getting the points 56 directly over the valve. Universal joint 50 allows valves to be ground in V type engines or other engines in which the valves are not vertical. The carriage 18 may be moved up or down on pipe 11 to any desired height and may be clamped in place by means of the screw 20. The points 56 fit into corresponding depressions in the valve 60 tending to rotate the same. The distance between the universal joint and the points 56 may be adjusted by loosening the nut 53 and sliding the sleeve 52 on the shaft 51. The motor 23 being started, the lever 40 is pushed down thus letting the friction cones 32 and 36 come into contact with each other and the valve 60 is rotated continuously in one direction. It is a well known fact that continuous rotation of a valve will not do a good grinding job. It is common practice to put a paste made of ground glass or emery and oil between the valve 60 and the seat 61. If the valve is rotated continuously in one direction large pieces of emery or glass tend to travel in concentric circles on the valve seat cutting grooves therein. For this reason, it is usually thought necessary to rotate the valve, first in one direction and then the other. I obviate this by providing a flat place 100 on the friction cone 32. During each revolution of this friction cone, the friction cone 36 is forced upwardly a sufficient distance to allow the valve 60 to rise from its seat under the influence of the spring 62. Immediately thereafter the friction cone 36 is forced sharply downwardly thus tending to crush and re-distribute the particles of emery and to displace them from their position so that they will not cut concentric grooves. I have found that by the use of my device, it is possible to grind valves very rapidly with unskilled labor so that they will attain the high polish and be absolutely gas tight. It is possible to supply more than one of the grinding devices as several of the heads 30 may be placed upon one of the radius bars 29 and driven by the shaft 27.

I claim as my invention:

An apparatus for grinding a valve in an internal combustion engine comprising a column; a carriage sliding vertically on said column; means for locking said carriage at any desired point on said column; a radius bar projecting outwardly from said column; a drive shaft carried by said radius bar; means carried on said carriage for driving said shaft; mechanism for gripping and turning said valve; a spring for lifting said valve from its seat; means by which said shaft drives said mechanism; and means which permits said spring to lift said valve from its seat during a portion of each revolution.

In testimony whereof, I have hereunto set my hand at Los Angeles, California, this 20th day of October, 1920.

VERNON M. EVERETT.